April 5, 1955     E. B. HAMMOND, JR     2,705,371
SIGHT LINE STABILIZING DEVICE

Filed March 22, 1946

INVENTOR
EDMUND B. HAMMOND, JR.

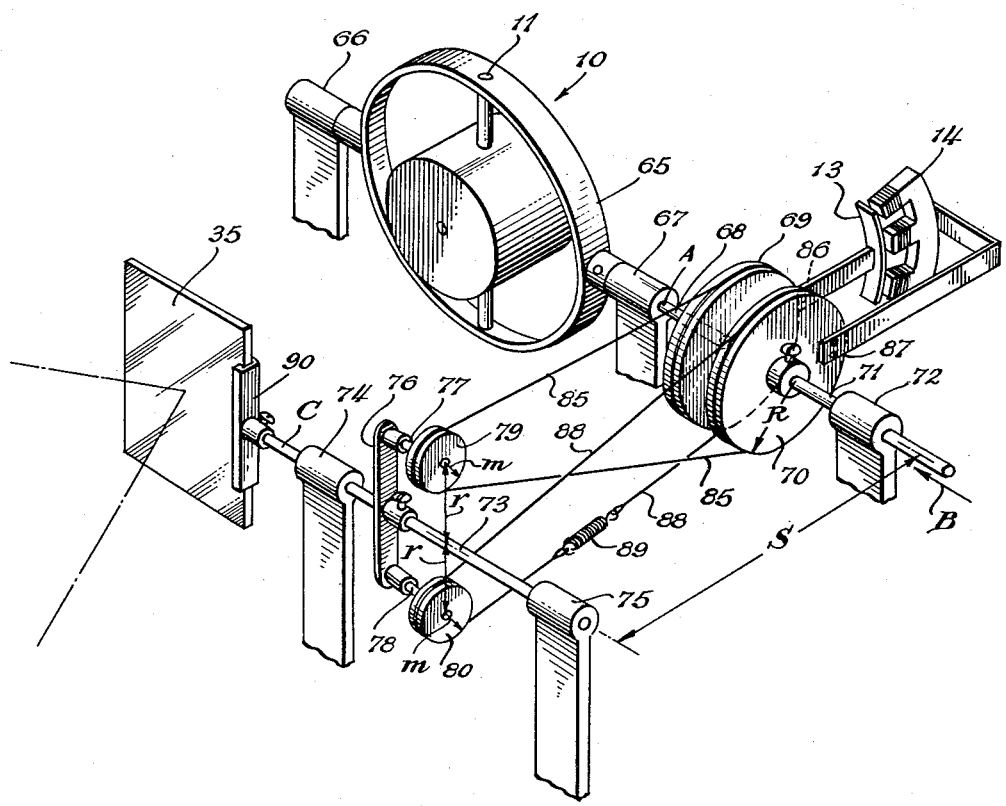

2,705,371

SIGHT LINE STABILIZING DEVICE

Edmund B. Hammond, Jr., Albertson, N. Y., assignor to The Sperry Corporation, a corporation of Delaware Application March 22, 1946, Serial No. 656,379

13 Claims. (Cl. 33—49)

This invention relates to a differential mechanism and more particularly to a differential mechanism adapted to independently stabilize the optical system of a gun sight mounted in a stabilized turret.

A feature of the invention is the provision of a differential mechanism having no backlash, low inertia and negligible friction.

Another feature of the invention is the provision of a differential mechanism for a stabilized gun sight in which the inputs for the differential are connected respectively to the supports for the armature and transformer of a gyro pick-off device, the output of the differential being used to actuate a mirror in the optical system of a gun sight to correct the line of sight for lag in the displacement of the gun turret by the servomotors.

The invention in another of its aspects relates to novel features of the instrumentalities described herein for achieving the principal objects of the invention and to novel principles employed in those instrumentalities, whether or not these features and principles are used for said principal objects or in the said field.

A further object of the invention is to provide improved apparatus and instrumentalities embodying novel features and principles, adapted for use in realizing the above objects and also adapted for use in other fields.

Stabilizing apparatus for aircraft turrets is well known. Usually a free gyro is used which is torqued by suitable control devices, such as handle bars, to cause the spin axis of the gyro to track a target. The torques imparted to the gyro provide a measure of angular rate of the target for computing the lead angle. Such gyros are provided with pick-off devices for the elevation and azimuth axes which control servos that maintain the turret positioned in accordance with the spin axis of the gyro and also stabilize the turret against roll, pitch and yaw of the airplane.

The response of the servo mechanism to relative displacement of associated pick-off members is rapid, but there is some servo lag, usually less than one degree which in certain stabilized turret arrangements can be tolerated. The present invention is designed particularly for a somewhat different stabilized sight from that briefly described above in which the spin axis of the gyro is displaced from the turret according to the line of sight, that is, the spin axis is offset from the turret according to the lead angle. In this arrangement, which will be described briefly below, the present invention is used to stabilize the line of sight to correct for lag in the servo system which actuates the turret.

The invention will now be described with the aid of the accompanying drawings, of which:

Fig. 2 shows a differential mechanism according to one form of the present invention.

Figure 1:
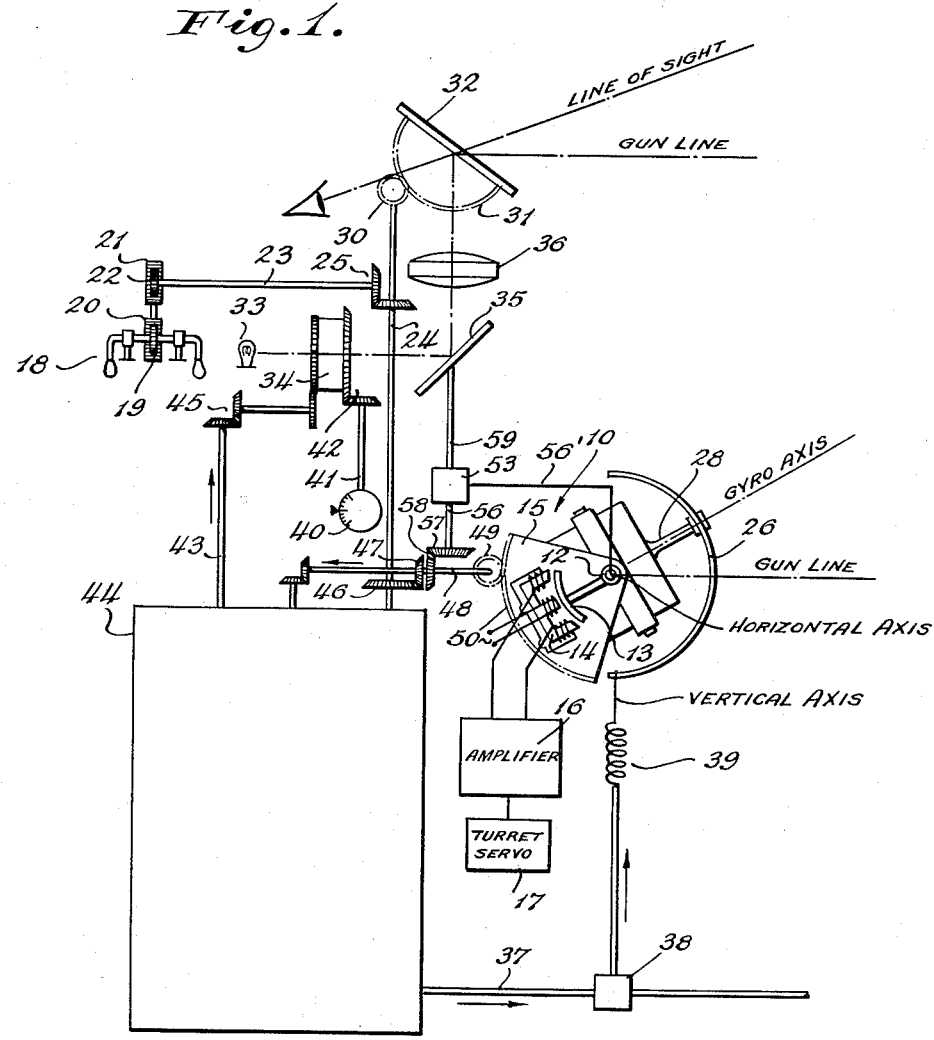
Fig. 1 shows schematically a portion of a computing gun sight.

In order to give a better understanding of the invention, a stabilized computing gun sight will be briefly described. Referring to Fig. 1, gyro 10 is supported for precession about its azimuth axis 11 (see Fig. 2) and its elevation axis 12 (see Fig. 1). The pick-off devices and associated mechanism for both axes are substantially the same and so only that associated with the elevation axis is shown.

An armature 13 is secured to elevation axis 12 and an E pick-off transformer 14 is attached to a plate 15 movable with respect to this axis. The transformer is connected in the conventional manner with an amplifier 16 which controls elevation turret servo 17. When any deviation occurs between the armature and transformer away from their normal centralized position, as shown in the drawings, the transformer transmits a signal to the amplifier of such direction as to actuate the servo to turn the turret to bring the transformer again into register with its armature when the signal disappears. The deviation between the armature and pick-off may be due to roll and pitch of the supporting aircraft or in the case of the particular sight being considered, may be due to the displacing of the transformer by the control mechanism used to turn the turret.

The control mechanism for the turret is indicated in the drawings as handle bars 18. It will be understood that the handle bars are rotatable about two intersecting axes to effect corresponding movement of the line of sight and the turret about the azimuth and elevation axes, although the mechanism therefor is not completely shown. When the handle bars are displaced about their horizontal axis, gear 19 fastened thereto actuates racks 20 and 21. The latter is in mesh with gear 22 fixed to shaft 23 which turns shaft 24 through bevel gears 25. Shaft 24 at its upper end is provided with a gear 30 in mesh with a gear sector 31 attached to transparent mirror 32 of the optical system of the sight. It will be understood that mirror 32 is rotatable about azimuth and elevation axes for target tracking purposes under control of handle bars 18. The apparatus for turning the mirror about the azimuth axis is not shown, the mechanism just described being for the purpose of turning the mirror about the elevation axis.

Light from a light source 33 shines through reticle 34 onto mirror 35. Usually the reticle is a ring aperture of adjustable diameter and light rays forming an image of the ring are projected by mirror 35 through a collimating lens 36 to the transparent mirror 32 where the adjustable ring is used by the operator in tracking the target.

Knob 40 is coupled with the reticle by shaft 41 and gears 42. The knob is used, according to known practice, to initially adjust the reticle in accordance with the dimensions of the target. Shaft 43 is actuated by the computer indicated by block diagram 44 adjusts the reticle by means of gears 45 according to range. The computer 44 includes ballistic and prediction mechanism, and may be of the type disclosed in application Serial No. 748,815, filed May 17, 1947.

When the handle bars 18 are moved in elevation, shaft 24 also actuates the computer 44 accordingly. Computer 44 is shown as having an output shaft 37 which applies through differential 38 angular displacements to one end of spring 39, the other end of which is attached to bail 26 pivoted to turn about the azimuth axis 11 shown in Fig. 2. Since spring 39 applies a torque to bail 26 proportional to the angular displacement of the output shaft of differential 38 the gyro is caused to precess about its elevation axis in a manner determined by the computer 44. Bail 26 is provided with a slot not shown, through which extends an arm 28 attached to the gyro casing in alignment with the spin axis. A torque on bail 26 is thus directly transmitted to the gyro casing.

Shaft 24 drives gears 46 and 47, shaft 48 and gear 49 when the handle bars are displaced in elevation. Gear 49 is in mesh with a gear sector 50 formed on the edge of plate 15 on which is mounted the E-transformer 14. Displacement of the handle bars moves the transformer relatively to the turret and armature 13 at the same time as the transparent mirror is displaced thereby. Immediately on displacement of the transformer with respect to its armature, a signal is transmitted from the transformer to amplifier 16 which controls servo 17 in such direction as to bring the armature into register again with its armature and cancel the signal.

As already mentioned, the servo system acts rapidly and efficiently but is subject to a small amount of lag following a sudden displacement of the handle bars. This lag is small, usually less than one degree, but it is sufficient to disturb the line of sight. Since according to usual practice, the optical system is mounted in a sight casing disposed on the gun in the gun turret, and since the gun and turret do not respond immediately to a motion of the pickups geared directly to the hand controls, the line of sight is displaced from its correct position by an amount depending on the turret's lag in response to the input signal. To stabilize the line of sight against turret lag, an optical compensating differential is provided for each precession axis of the gyro. Since the compensating differentials for the respective axes are similar, only one is shown in the drawings.

The compensating differential for the elevation precession axis is shown schematically in Fig. 1 which discloses the relation of this differential with a portion of the optical system of the sight. It will be understood that the optical system also includes a second stabilizing mirror, not shown, which is operated by a differential, also not shown, associated with the azimuth axis of the gyro 10.

In Fig. 1, the compensating differential 53 has one input displaced by shaft 56 driven from shaft 48 by gears 57 and 58 in fixed relation with plate 15 which supports pick-off transformer 14. A second input for differential 53 is actuated by a drive indicated by line 56' coupled with the gyro at the elevation axis 12. By this arrangement, the first input is effectively connected to the sight casing and, since the sight is mounted in the turret, to the turret itself, so that for any movement of the sight and turret in space there is a corresponding movement of the input; whereas, the second input, being connected to the gyro gimbal, is effectively fixed in space with reference to movements of the sight and turret. The output of the differential actuates shaft 59 carrying mirror 35. When relative displacement of the transformer 14 and its armature 13 occurs, which displacement is due to servo lag, the differential arrangement is effective to displace the mirror 35 about a horizontal axis to compensate for the lag error introduced into the sight line position about its elevation axis. Thus, while lag error is introduced into the sight case and the turret, the error is compensated for by the displacement of the stabilizing mirror, so that as far as an observer is concerned, the line of sight is unaffected by turret lag.

Since relative displacement of the respective inputs for differential 53 are always very small, the differential must operate accurately with no backlash or lost motion. Since one input of the differential is actuated directly from the gyro gimbal, the differential must operate substantially without friction for otherwise a load would be imposed on the gyro axis which would tend to coerce the gyro. A differential mechanism which satisfies these requirements is shown in Fig. 2. In this figure, as well as in Fig. 1, only so much of the gyro mechanism is shown as is necessary to describe the application of the invention thereto.

The gyro 10 is shown in Fig. 2 as being supported for rotation about the azimuth or vertical axis 11 by gimbal ring 65 which is supported in bearings 66 and 67 for rotation about the horizontal or elevation axis, shaft 68 attached to the gimbal ring extending through bearing 67.

The differential mechanism, according to a preferred embodiment of the invention comprises a pair of like pulleys 69 and 70, preferably of a light weight metal, pulley 69 being secured on shaft 68 while pulley 70 is coaxially disposed on an input shaft 71 which turns in a bearing 72. Shafts 68 and 71 are the input shafts for the differential. Armature 13 is shown as being attached to pulley 69 while the associated "E" pick-off transformer is shown as being attached to pulley 70. When there is no relative displacement of the inputs just mentioned, the armature and transformer are in register as shown in the drawing and no signal flows from the transformer.

Shaft 73 supported by bearings 74 and 75 is the output shaft of the differential. A cross arm 76 is fastened to shaft 73. Pivots 77 and 78 are secured respectively near opposite ends of the cross arm at equal distances from the axis of shaft 73. Identical small pulleys 79 and 80 are supported respectively by pivots 77 and 78. A belt 85 preferably of very fine music wire has one end fastened to a pin 86 in the rear side of pulley 69. The belt passes over the top of pulley 69 and thence over and around pulley 79, along the underside of pulley 70 where the opposite end of the belt is attached to a pin 87 in the rearside of pulley 70. A similar belt 88 secured at one end to pin 87 passes over the top of pulley 70, thence over the top and around small pulley 80, along the undersurface of pulley 69 where the end of the belt is fastened to pin 86 in pulley 69. A spring 89 is included in belt 88 to eliminate backlash. A mirror 35 equivalent to that shown in Fig. 1 is supported by a bracket 90 attached to shaft 73.

It is thought that the operation of the device can be understood from inspection of Fig. 2. Assuming that the gyro gimbal 65 is turned about its elevation axis which coincides with that of shaft 68 and the turret is moved therewith so no lag occurs, then the movement of pulley 70 coincides with that of pulley 69. Assuming, for example, that the displacement of both pulleys is in a clockwise direction from their position shown in Fig. 2, and since pulleys 69 and 70 have equal diameters, pulley 69 will wind up, and pulley 70 will unwind a like amount of belt 85. At the same time pulley 70 will wind up, and pulley 69 will unwind a like amount of belt 88. Under the circumstances, pulleys 79 and 80 will both turn on their pivots the same angular distance and no displacement of output shaft 73 and mirror 35 takes place. When pulleys are both displaced in a counter-clockwise direction, the various parts move as described but in the opposite direction, and no displacement of output shaft 73 and mirror 35 takes place.

Assume that the gyro is displaced to the position shown in Fig. 2, and some turret lag occurs which leaves pulley 70 lagging pulley 69 momentarily in a clockwise direction and angular distance of one degree or less, then the position of the upper part of belt 85 is fixed but the lower part thereof is slightly relaxed due to the displacement of pulley 70. Under the circumstances, no slack occurs in belt 85 because, due to the displacement of pulley 70, the upper part of belt 88 is wound up thereon and, since the opposite end of belt 88 is fixed to pin 86 in pulley 69, the cross arm 76, shaft 73 and mirror 35 are proportionately tilted, which tilt disappears smoothly as the servo mechanism restores the pick-off transformer 14 and its armature into register. When pulley 70 is displaced with respect to pulley 69 but in a counterclockwise direction, the parts of the differential function as described but in the opposite direction. By suitably proportioning the diameters of pulleys 69 and 70 with respect to the radii at which pivots 77 and 78 are offset from the axis of shaft 73 the desired proportional output deflection may be obtained. An approximate equation for the differential is $$C \cong \left[ \frac{R\sqrt{[r^2+S^2]\left[1-\frac{(R-m)^2}{r^2+S^2}\right]}}{2rS\left[1+\frac{(R-m)^2}{r^2+S^2}\right]} \right][A-B]$$

for small values of C where R is the radius of pulleys 69 and 70, A is the angular displacement of pulley 69; B the angular displacement of pulley 70; C the angular displacement of output shaft 73; r is the radial distance from the axis of shaft 73 to the axes of the respective pulleys 79 and 80; m is the radius of pulleys 79 and 80; and S is the distance between the axes of shaft 73 and shafts 68 and 71. In the device as constructed, pulleys 79 and 80 are provided with jeweled bearings which turn on small pivots while pulleys 69 and 70 turn on antifriction bearings.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a sight supported by a gyro stabilized element wherein the element is stabilized in space by a servo system controlled by the gyro, means for independently stabilizing the sight against servo lag which comprises a differential having a pair of input members respectively coupled to the gyro at a precession axis thereof and to the stabilized element, an output member for the differential responsive to relative displacement of the input members, and means for displacing the line of sight defined by the sight actuated by the output member.

2. In a sight supported by a gyro stabilized element wherein the element is stabilized in space by a servo system controlled by the gyro, means for independently stabilizing the sight against servo lag which comprises a differential having one input member operatively connected to the gyro at a precession axis thereof, a second input member operatively connected to the stabilized element, an output shaft for the differential movable in accordance with the relative displacement of the input members, and a line of sight deflecting member supported on the output shaft.

3. In a sight supported by a gyro stabilized turret having an optical system for defining the line of sight, wherein the turret is stabilized in space by a servo system controlled by the gyro, means for independently stabilizing the line of sight against servo lag which comprises a differential having an input member operatively connected to the gyro at a precession axis thereof, a second input member operatively connected to the turret, an output member for the differential displaceable in accordance with the relative displacement of the input members, and a member in the optical system for deflecting the line of sight actuated by the output member.

4. In a gyro stabilized sight wherein an optical system defining the line of sight is stabilized in space by a servo system controlled in response to relative displacement of the gyro and the sight casing, means for further stabilizing the line of sight against servo lag which comprises mirror means included in the optical system effective when moved to deflect the line of sight, a differential having a pair of input members operatively coupled respectively to the gyro at a precession axis thereof and to the sight casing, and an output member for the differential effective to move the mirror means in accordance with relative displacement of said input members.

5. In a gyro stabilized sight wherein an optical system defining the line of sight is stabilized in space by a servo system responsive to relative displacement of the sight casing with respect to the precession axes of the gyro, means for further stabilizing the line of sight against servo lag which comprises a sight line deflecting mirror disposed in the optical system, a differential having a pair of input members, one being operatively connected to the sight casing and the other to the gyro at a precession axis, an output shaft for the differential supporting the deflecting mirror effective to tilt the mirror in accordance with the relative displacement of said input members.

6. In a gyro stabilized sight wherein the line of sight is stabilized in space by a servo system controlled by a pair of cooperating pick-off members operatively connected respectively to a precession axis of the gyro and the casing for the sight, means for further stabilizing the line of sight against servo lag which comprises a differential having a pair of input members operatively coupled respectively to the pick-off members, an output member for the differential movable on relative displacement of the pick-off members, and means for displacing the line of sight controlled by the output member.

7. In a stabilized turret having a gun sight wherein the line of sight is stabilized in space about one precession axis of a gyro by a servo system controlled by a pair of cooperating pick-off members, one pick-off member being operatively connected to the gyro to turn therewith about said precession axis, the other being operatively connected to the turret, means for independently stabilizing the line of sight about said axis against servo lag which comprises a differential having a pair of input members operatively coupled to the respective pick-off members and an output member responsive to the relative displacement of the pick-off members, and means for displacing the line of sight actuated by the output member.

8. In a gyro stabilized sight wherein an optical system defining the line of sight is stabilized in space about one precession axis of the gyro by a servo system controlled by a pair of cooperating pick-off members, one being operatively connected to turn with the gyro about said precession axis, the other being operatively connected with the casing for the sight, means for further stabilizing the line of sight against servo lag which comprises a differential having a pair of input members operatively coupled respectively to the pick-off members and an output member movable on relative displacement of the pick-off members, and a member in the optical system for deflecting the line of sight actuated by said output member.

9. In a gyro stabilized sight wherein an optical system defining the line of sight is stabilized in space by a servo system controlled by a pair of cooperating pick-off members operatively connected respectively to a pivot member disposed along a precession axis of the gyro and the casing for the sight, means for further stabilizing the line of sight against servo lag which comprises mirror means in the optical system effective when moved to deflect the line of sight, a differential having a pair of input members operatively coupled respectively to the pick-off members and an output therefor effective to move the mirror means in response to relative displacement of the pick-off members.

10. In a gyro stabilized sight wherein an optical system defining the line of sight is stabilized in space by a servo system controlled by a pair of cooperating pick-off members operatively coupled respectively to a pivot member disposed along a precession axis of the gyro and the casing for the sight, means for stabilizing the line of sight against servo lag which comprises a sight line deflecting mirror disposed in the optical system, a differential having a pair of input members coupled respectively to the pick-off members, and an output shaft therefor supporting the deflecting mirror and effective to tilt the mirror in accordance with the relative displacement of the pick-off members.

11. In a gyro stabilized sight wherein an optical system defining the line of sight is stabilized in space by a servo system controlled in response to relative displacement of the gyro and the casing for the sight, means for stabilizing the line of sight against servo lag which comprises mirror means included in the optical system effective when moved to deflect the line of sight, a differential comprising a pair of coaxially disposed input pulleys operatively coupled respectively to the gyro at a precession axis thereof and to the sight casing, an output shaft for the differential operatively connected to the mirror means, a second pair of pulleys, means supporting the second pair of pulleys on the output shaft on opposite sides thereof, and belt means interconnecting the input pulleys with the second pair of pulleys effective to displace the output shaft in accordance with the relative displacement of the input pulleys, the arrangement being such that corresponding displacement of the input pulleys has no effect on the output shaft.

12. In a gyro stabilized sight wherein an optical system defining the line of sight is stabilized in space about one precession axis of the gyro by a servo system controlled by a pair of cooperating pick-off members relatively displaceable by the movement of the gyro about said precession axis, means for stabilizing the line of sight against servo lag which comprises a differential having a pair of coaxially disposed input pulleys coupled respectively to the pick-off members, an output shaft for the differential disposed in spaced parallel relation with the axes of the pulleys, a belt securing device for each pulley disposed on the sides thereof remote from the output shaft, a second pair of pulleys of smaller diameter than the input pulleys, means supporting the second pair of pulleys on the output shaft on opposite sides thereof in uniformly spaced relation therewith, and a pair of belts on the first-mentioned pulleys attached respectively to the belt securing means thereof and extending from corresponding sides of the pulleys, the belts being wound in the same direction about individual ones of the second pair of pulleys and then transposed and continued about opposite ones of the input pulleys and fastened to the securing devices thereon, the output shaft being movable in response to relative displacement of the pick-off members, and a line of sight deflecting mirror of the optical system supported on the output shaft.

13. In a stabilized sight wherein the line of sight is stabilized in space about one precession axis of a gyro by a servo system controlled by a pair of cooperating pick-off members relatively displaceable by the movement of the gyro about said precession axis, means for independently stabilizing the line of sight against servo lag which comprises a differential having a pair of coaxially disposed input pulleys coupled respectively to the pick-off members, an output shaft for the differential disposed in spaced parallel relation with the axes of the pulleys, a belt securing device for each pulley disposed on the sides thereof remote from the output shaft, a second pair of pulleys of smaller diameter than the input pulleys, means supporting the second pair of pulleys on the output shaft on opposite sides thereof in uniformly spaced relation therewith, and a pair of belts on the first-mentioned pulleys attached respectively to the belt securing means thereof and extending from corresponding sides of the pulleys, the belts being wound in the same direction about individual ones of the second pair of pulleys and then transposed and continued about opposite ones of the input pulleys and fastened to the securing devices thereon, the output shaft being movable in response to relative displacement of the pick-off members, and means for deflecting the line of sight operatively connected to the output shaft.

References Cited in the file of this patent

UNITED STATES PATENTS

| Number | Name | Date |
|---|---|---|
| 1,688,559 | Sperry | Oct. 23, 1928 |
| 1,936,442 | Willard | Nov. 21, 1933 |
| 1,937,336 | Ford et al. | Nov. 28, 1933 |
| 2,222,551 | Ziebolz et al. | Nov. 19, 1940 |
| 2,371,606 | Chafee et al. | Mar. 20, 1945 |
| 2,408,356 | Willard | Sept. 24, 1946 |
| 2,437,463 | Ford | Mar. 9, 1948 |